(12) United States Patent
Yang et al.

(10) Patent No.: US 12,067,140 B2
(45) Date of Patent: Aug. 20, 2024

(54) METHOD AND SYSTEM FOR STORING ELECTRONIC DOCUMENTS BASED ON DISTRIBUTED ENVIRONMENT

(71) Applicant: Jiaying Technology Co., Ltd., Hunan (CN)

(72) Inventors: Sheng Yang, Hunan (CN); Haibo Zeng, Hunan (CN); Ping Yuan, Hunan (CN); Bicheng Tang, Hunan (CN); Ying Huang, Hunan (CN)

(73) Assignee: Jiaying Technology Co., Ltd., Hunan (CN)

( * ) Notice: Subject to any disclaimer, the term of this patent is extended or adjusted under 35 U.S.C. 154(b) by 220 days.

(21) Appl. No.: 17/860,695

(22) Filed: Jul. 8, 2022

(65) Prior Publication Data

US 2022/0343011 A1 Oct. 27, 2022

(30) Foreign Application Priority Data

Nov. 1, 2021 (CN) .......................... 202111279475.5

(51) Int. Cl.
*G06F 21/62* (2013.01)
*G06F 16/93* (2019.01)
*G06F 21/16* (2013.01)

(52) U.S. Cl.
CPC .......... *G06F 21/6218* (2013.01); *G06F 16/93* (2019.01); *G06F 21/16* (2013.01); *G06F 2221/2141* (2013.01)

(58) Field of Classification Search
CPC ....... G06F 21/6218; G06F 19/93; G06F 21/16
(Continued)

(56) References Cited

U.S. PATENT DOCUMENTS

| 7,228,437 B2 * | 6/2007 | Spagna .................. H04W 4/02 713/193 |
| 2003/0177400 A1 * | 9/2003 | Raley .................. G06F 21/6218 713/168 |

(Continued)

FOREIGN PATENT DOCUMENTS

| CN | 105825139 A | 8/2016 |
| CN | 112559642 A | 3/2021 |

(Continued)

*Primary Examiner* — Dant B Shaifer Harriman (57) ABSTRACT

A method and system for storing electronic documents based on a distributed environment includes the following steps of: a storage management server receives a document data stream sent by a client; the storage management server parses the document type of the electronic document; the storage management server Match the corresponding first storage server based on the document type of the electronic document and the user information; the storage management server sends the corresponding electronic document to the corresponding first storage server; the first storage server is based on the first storage server The digital watermark loading rule of the server loads the digital watermark on the electronic document; the first storage server stores the electronic document loaded with the digital watermark. The embodiment of the present invention facilitates the distributed storage server to store different types of electronic documents in combination with electronic document types, and ensures that subsequent users can manage and refer to the stored electronic documents.

7 Claims, 3 Drawing Sheets

(58) Field of Classification Search
USPC .............................................................. 726/1
See application file for complete search history.

(56) References Cited

U.S. PATENT DOCUMENTS

| | | | | |
|---|---|---|---|---|
| 2003/0196092 | A1* | 10/2003 | Raley | H04L 63/0823 |
| | | | | 713/176 |
| 2003/0196093 | A1* | 10/2003 | Raley | H04L 67/62 |
| | | | | 713/176 |
| 2007/0033637 | A1* | 2/2007 | Yami | H04L 9/3234 |
| | | | | 726/2 |
| 2008/0091735 | A1* | 4/2008 | Fukushima | G06F 21/645 |
| 2020/0410024 | A1* | 12/2020 | Noble | G09B 7/02 |
| 2021/0216612 | A1* | 7/2021 | Wojcik | H04L 9/3247 |

FOREIGN PATENT DOCUMENTS

| | | |
|---|---|---|
| CN | 112733095 A | 4/2021 |
| CN | 112948857 A | 6/2021 |

\* cited by examiner

METHOD AND SYSTEM FOR STORING ELECTRONIC DOCUMENTS BASED ON DISTRIBUTED ENVIRONMENT

CROSS REFERENCE OF RELATED APPLICATION

The present application claims priority under 35 U.S.C. 119(a-d) to CN 202111279475.5, filed Nov. 1, 2021.

BACKGROUND OF THE PRESENT INVENTION

Field of Invention

The present invention relates to the technical field of document storage, and more particularly to a method and system for storing electronic documents based on a distributed environment.

Description of Related Arts

With the in-depth development of the Internet industry, a large amount of electronic documents are uploaded and previewed to the storage system every day. The browsing of traditional electronic documents includes documents in doc, xls, ppt, docx, pptx, pdf, swf, electronic pictures and other formats. Document storage on the server involves differentiated management requirements. For example, different users and document types will involve different management modes. For example, according to the user's level or role, the corresponding documents need to be stored hierarchically, and the loading mode of watermarks corresponding to different document types is also different, which makes the storage of the entire electronic document on the system has great confusion, and it is not convenient for subsequent users to manage and refer to the electronic documents stored on the system. The conventional distributed storage system cannot adapt to the management requirements for document storage as well.

SUMMARY OF THE PRESENT INVENTION

The purpose of the present invention is to overcome the deficiencies of the prior art, and the present invention provides a method and system for storing electronic documents based on a distributed environment. The storage server realizes the digital watermark loading of electronic documents, which facilitates the distributed storage server to store different types of electronic documents in combination with electronic document types, and ensures that subsequent users can manage and review the stored electronic documents.

Accordingly, in order to solve the problems mentioned above, the present invention provides a method for storing electronic documents based on a distributed environment, comprising:

receiving a document data stream sent by the client by a storage management server, wherein the document data stream comprises: user information and electronic documents;

parsing a document type of the electronic document by the storage management server;

matching a corresponding first storage server based on the document type of the electronic document and the user information by the storage management server;

sending the corresponding electronic document to the corresponding first storage server by the storage management server;

loading a digital watermark on the electronic document based on a digital watermark loading rule of the first storage server by the first storage server; and storing electronic documents loaded with digital watermarks by the first storage server.

Preferably, the step of receiving a document data stream sent by the client by a storage management server comprising:

receiving the document data stream sent by the client based on the self-authorization management method by the storage management server.

Preferably, receiving the document data stream sent by the client based on the self-authorization management method by the storage management server comprising:

performing automatic authorization processing on the distributed storage tasks that have been marked as automatically authorized by the storage management server, wherein the storage management server is provided with a first-in-first-out stack and an external storage structure;

firstly pushing the document data streams sent by different clients into a FIFO stack by the management server;

after the stacking is successful, performing self-authorization and execution-related behaviors on the distributed storage task and pushing the completion flag into the first-in, first-out stack by the storage management server;

wherein while judging that the FIFO stack overflows, the overflowed document data stream is copied to the external storage according to the FIFO principle, and the overflowed copied information is generated and pushed into the FIFO stack.

Preferably, the step of parsing the document type of the electronic document by the storage management server comprising:

parsing and processing the document data stream in the FIFO stack according to the FIFO principle by the storage management server;

automatically deleting the corresponding document data stream from the FIFO stack after parsing and processing a document data stream by the storage management server; and while finding the overflowed copied information, sending the overflowed document data stream in the external storage back to the FIFO stack for parsing processing according to the FIFO principle by the storage management server.

Preferably, the electronic document types comprises: doc format documents, xls format documents, ppt format documents, docx format documents, pptx format documents, pdf format documents, swf format documents, and picture format documents.

Preferably, the loading modes of the digital watermark comprise: a spatial domain watermark loading mode and a transform domain watermark loading mode.

Preferably, the step of loading the digital watermark on the electronic document based on the digital watermark loading rule of the first storage server by the first storage server comprising:

analyzing the electronic document to determine the watermark parameters to be configured and the parameter values of the watermark parameters;

constructing watermark information based on watermark parameters and watermark parameter values; and loading the watermark information into the specified position of the electronic text, and generate the electronic document with the digital watermark.

Preferably, the watermark parameter includes at least one of the following: a storage path of the watermark image, the horizontal quantity of the watermark, the vertical quantity of the watermark, the transparency of the watermark image, and the rotation angle of the watermark image.

The present invention further provides a system for storing electronic documents based on a distributed environment, comprising:

client terminals configured to provide users with an operation interface and send document data streams to the storage management server, where the document data streams comprises: user information and electronic documents;

a management server configured to receive the document data stream sent by the client and parse the document type of the electronic document; match the corresponding storage server based on the document type of the electronic document and the user information, and send the corresponding electronic document to the corresponding storage server on the server; and distributed storage servers configured to load a watermark on an electronic document based on its own watermark loading rule, and stores the electronic document loaded with the watermark.

Preferably, the system for storing electronic documents based on a distributed environment, further comprises several API gateways, wherein each API gateway of the several API gateways communicates with more than one client, and the several API gateways send the document data streams on the several clients to the management server.

The embodiment of the present invention adopts a distributed storage system to manage different electronic documents according to user information and electronic document types, so that it can match different storage servers in combination with user information or roles to store electronic documents sent by the client, which can Adaptive storage of electronic documents to meet user level or role requirements. In order to facilitate the management and review of electronic documents, different distributed storage servers combine electronic document types to load digital watermarks on electronic documents stored on the server, so that electronic documents have corresponding watermarks, so that electronic documents have certain traceability, and it is also convenient to Subsequent users manage and review electronic documents stored on the system, which also facilitates copyright management of electronic documents. The distributed storage system can be widely used in e-government and network office environments, and it also facilitates the unified management of electronic documents in e-government and network office environments, reduces document organization errors, and loads corresponding digital files for different electronic document types. The watermark also reduces the error rate of watermark loading and improves the storage efficiency of electronic documents in the distributed storage system.

BRIEF DESCRIPTION OF THE DRAWINGS

In order to more clearly illustrate the embodiments of the present invention or the technical solutions in the prior art, the following briefly introduces the accompanying drawings that need to be used in the description of the embodiments or the prior art. Obviously, the accompanying drawings in the following description are only some embodiments of the present invention, and for those of ordinary skill in the art, other drawings can also be obtained from these drawings without creative effort.

DETAILED DESCRIPTION OF THE PREFERRED EMBODIMENT

The technical solutions in the embodiments of the present invention will be clearly and completely described below with reference to the accompanying drawings in the embodiments of the present invention. Obviously, the described embodiments are only a part of the embodiments of the present invention, but not all of the embodiments. Based on the embodiments of the present invention, all other embodiments obtained by those of ordinary skill in the art without creative efforts shall fall within the protection scope of the present invention.

Figure 1:
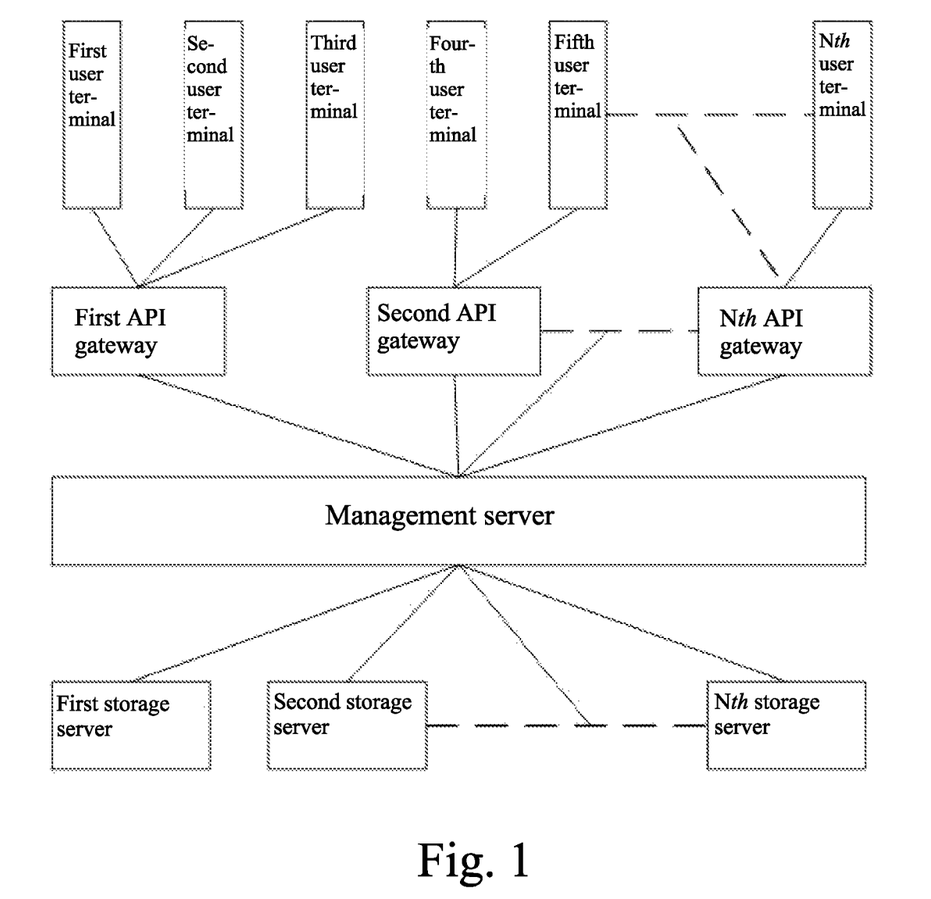
FIG. 1 is a schematic structural diagram of a system for storing electronic documents based on a distributed environment in an embodiment of the present invention.

Specifically, FIG. 1 shows a schematic structural diagram of a system for storing electronic documents based on a distributed environment in an embodiment of the present invention. The system includes:

Several client terminals are used to provide users with an operation interface and send document data streams to the storage management server, where the document data streams include: user information and electronic documents;

The management server is used to receive the document data stream sent by the client and parse the document type of the electronic document; match the corresponding storage server based on the document type of the electronic document and the user information, and send the corresponding electronic document to the corresponding storage server on the server;

Several distributed storage servers, each of the several distributed storage servers loads a watermark on an electronic document based on its own watermark loading rule, and stores the electronic document loaded with the watermark.

Specifically, the several user terminals comprise: a first user terminal, a second user terminal, a third user terminal, a fourth user terminal, a fifth user terminal, . . . , an Nth user terminal, and each user terminal of the several user terminals An operation interface can be provided for users in combination with the actual application environment, and the operation interface or display interface can provide users with operation specifications or operation entries, so that a document data flow can be generated based on the operation specifications or operation entries, and the document data flow includes: user information and electronic documents. When each client provides an operation interface or an operation entry for the corresponding user, the user information corresponding to the user already has an association relationship with the attribute tag between the electronic document, that is, there is an association relationship between the electronic user and the user information For example, if the attribute of the electronic document associated with the first user is important, the electronic document should be processed for important storage, and the attribute of the electronic document associated with the second user is not important, then the electronic document only needs to be stored in general, combining different Users can implement classified storage management to avoid redundancy in electronic document management.

Specifically, several clients are connected through several API gateways, and several API gateways send document data streams on several clients to the management server, and each API gateway among several API gateways is associated with more than one user The several API gateways here include: the first API gateway, the second API gateway, . . . , the Nth API gateway, each API gateway can be connected to the user end of the local area network, and realizes the connection between the user end and the management server. Communication. That is, the first API gateway communicates with the first client, the second client, and the third client, and realizes the communication between the first client, the second client, the third client and the management server, and the second API gateway communicates with the management server. The fourth client terminal and the fifth client terminal communicate, and realize the communication between the fourth client terminal, the fifth client terminal and the management server.

Each API gateway here provides a data communication gateway for the associated client to aggregate and generate a data interaction interface. In order to ensure the security of data communication, an authentication center needs to be created in the system. The API gateway performs real-name authentication and registration in the authentication center. The authentication center issues a data upload token to each client based on user information. Each client carries its corresponding data upload token, and the document data is uploaded through the associated API gateway. The stream is sent to the management server.

The authentication center here will be responsible for managing the user information, that is, the account and password information of the end user. When the user uploads the document data stream to the system based on the client, it is necessary to extract the user information and verify the account password first. The data upload token is issued, and the data upload token is generated by an encryption algorithm; the user end should bring the data upload token when sending the document data stream to the system end, and the docking application system end uses the data upload token as all the required data uploading tokens. The interface for authority control, each interface will hand over the data upload token to the authentication center to verify the authority. If the authentication center verifies that the data upload token is legal and valid, it controls the API gateway to send the document data stream to the management server for business processing. The authentication center here can be implemented by an independent authentication server or a management server. By sending a data upload token, the legitimacy of the data sent by the client is guaranteed, and the security of data transmission is also guaranteed.

Specifically, the storage management server here receives the document data stream sent by the client, and the document data stream includes: user information and electronic documents; the storage management server parses the document type of the electronic document; the storage management server is based on the electronic document The document type and user information match the corresponding first storage server; the storage management server sends the corresponding electronic document to the corresponding first storage server; the first storage server is based on the number of the first storage server. The watermark loading rule loads a digital watermark on the electronic document; the first storage server stores the electronic document loaded with the digital watermark.

Specifically, the storage management server performs automatic authorization processing on the distributed storage tasks that have been marked as automatically authorized, and the storage management server is provided with a first-in-first-out stack and an external storage structure; the management server first Push the document data streams sent by different clients into the first-in first-out stack; after the stacking is successful, the storage management server performs self-authorization and execution-related actions on the distributed storage task and pushes the completion flag into the first-in-first-out stack. First-out stack; when judging that the FIFO stack overflows, copy the overflowed document data stream to external storage according to the FIFO principle, and generate overflow copied information and push it into the FIFO stack.

Specifically, the storage management server parses and processes the document data streams in the FIFO stack according to the FIFO principle; the storage management server parses and processes a document data stream after parsing and processes the corresponding document data stream. Automatically delete from the FIFO stack; when the storage management server finds the overflowed copied information, it sends the overflowed document data stream in the external storage back to the FIFO stack for parsing according to the FIFO principle deal with.

The storage management server receives the document data stream sent by the client based on the self-authorization management method, and it can respond to the document data stream on the client in real time, avoiding the accumulation of document data streams on the task processing end and failing to realize the task processing, and also avoiding the document data stream. Electronic documents in the data stream are missing.

It should be noted that the types of electronic documents here include: doc format documents, xls format documents, ppt format documents, docx format documents, pptx format documents, pdf format documents, swf format documents, and picture format documents.

Figure 2:
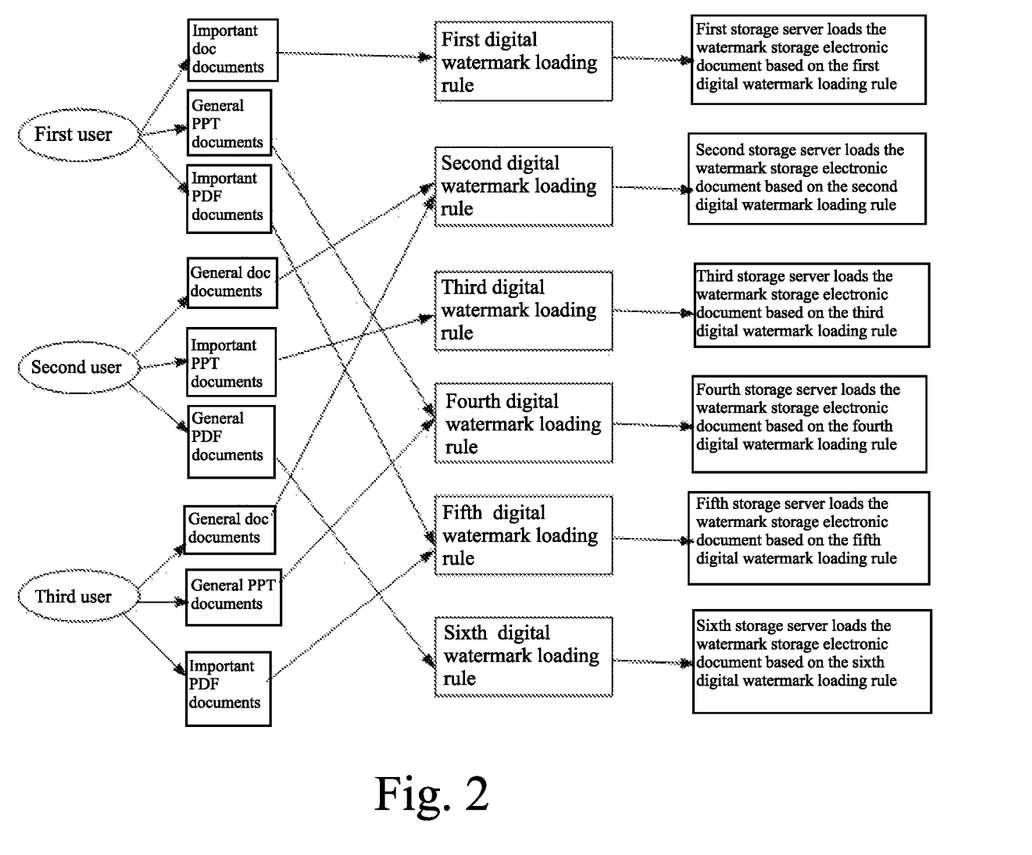
FIG. 2 is a schematic diagram of a mapping relationship based on distributed storage system storage data in an embodiment of the present invention.

FIG. 2 shows a schematic diagram of the mapping relationship based on distributed system storage data, here it is set that the electronic documents involved in the first user include: doc document (important), ppd document (general), pdf document (important); set here The electronic documents involved by the second user include: doc documents (general), ppd documents (important), and pdf documents (general); here it is set that the electronic documents involved by the third user include: doc documents (general), ppd documents (general), pdf document (important), in the specific implementation process, the importance of the document here can be set in combination with user data, or the importance of the document can be set by the user. Different storage servers set the storage content according to the document type and the degree of importance of the document. For example, the document type stored in the first storage server is set to be a doc format document, and its electronic document storage has a high degree of importance; the second storage server is set to store The document type is a doc format document, and the importance of its electronic document storage is general; the document type stored by the third storage server is set to a ppt format document, and its electronic document storage importance is high; the document stored by the fourth storage server is set. The type is ppt format document, and the importance of its electronic document storage is general; the document type stored by the fifth storage server is set to pdf format document, and its electronic document storage importance is high; the document type stored by the sixth storage server is set to be pdf format documents, the importance of electronic document storage is general. The distributed storage process of electronic documents is realized through the marking of user identity and the type of electronic documents, and the distributed storage system is used to manage different electronic documents according to user information and electronic document types, so that it can combine user information. Or roles are used to match different storage servers to store electronic documents sent by the client, which can adaptively store electronic documents to meet user level or role requirements. In order to facilitate the management and review of electronic documents, different distributed storage servers combine electronic document types to load digital watermarks on electronic documents stored on the server, so that electronic documents have corresponding watermarks, so that electronic documents have certain traceability, and it is also convenient to Subsequent users manage and review electronic documents stored on the system, which also facilitates copyright management of electronic documents. The distributed storage system can be widely used in e-government and network office environments, and it also facilitates the unified management of electronic documents in e-government and network office environments, reduces document organization errors, and loads corresponding digital files for different electronic document types. The watermark also reduces the error rate of watermark loading and improves the storage efficiency of electronic documents in the distributed storage system.

It should be noted that the loading methods of the digital watermark here include: a spatial domain watermark loading method and a transformation domain watermark loading method.

It should be noted that, loading the digital watermark on the electronic document by the first storage server based on the digital watermark loading rule of the first storage server includes: analyzing and analyzing the electronic document, and determining the watermark parameters to be configured and the parameter values of the watermark parameters; The watermark parameters and the watermark parameter values construct watermark information; the watermark information is loaded into the designated position of the electronic text to generate an electronic document with a digital watermark. The watermark parameter includes at least one of the following: a storage path of the watermark image, the horizontal quantity of the watermark, the vertical quantity of the watermark, the transparency of the watermark image, and the rotation angle of the watermark image. Each of the several distributed storage servers has its own digital watermark loading rule, which presets the watermark parameter and the parameter value of the watermark parameter in combination with the type of electronic document to be stored, which can be used for different electronic documents. The document realizes the watermark loading, which meets the watermark loading requirements of different types of electronic documents, making the watermark loading more standardized.

The storage path of the watermark image here includes but is not limited to the size of the watermark image and the type of the watermark image. The size of the watermark image should be reasonably set in combination with the horizontal quantity of the watermark and the vertical quantity of the watermark. The type of the watermark image should support the construction of the generated bitmap, the supported files The formats are BMP, GIF, EXIF, JPG, PNG and TIFF, etc.

The horizontal number of watermarks here refers to the horizontal arrangement of watermark images, which can be set between 1 and 20 in combination with the document type; for example, taking an A4 page as an example, the width of the watermark image×the horizontal number of watermarks cannot be greater than 500.

Here, the transparency of the watermark image can be set to a value between 1-254. The larger the value, the clearer the image.

Here, the rotation angle of the watermark image can be set to a value between 0-360, which can be a clockwise rotation angle or a counterclockwise rotation angle.

It should be noted that the page width and page height of the electronic document can be obtained during the analysis and analysis of the electronic document, and the watermark parameters and parameter values of the watermark parameters are adaptively configured based on the page width and page height.

Figure 3:
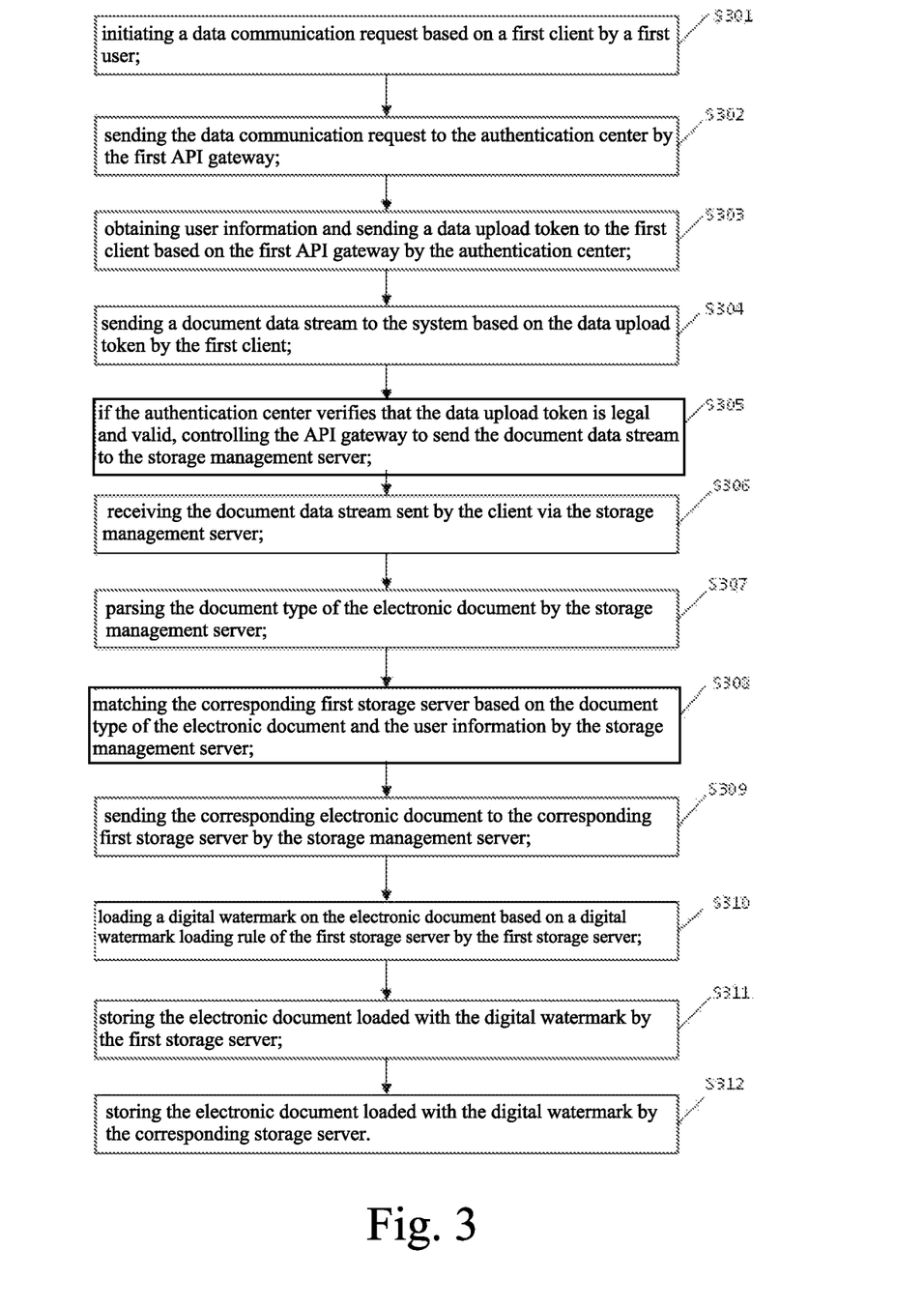
FIG. 3 is a flowchart of a method for storing electronic documents based on a distributed environment in an embodiment of the present invention.

FIGS. 1-3 shows a flowchart of a method for storing electronic documents based on a distributed environment in an embodiment of the present invention, including the following steps:

S301: initiating a data communication request based on a first client by a first user;

S302: sending the data communication request to the authentication center by the first API gateway;

S303: obtaining user information and sending a data upload token to the first client based on the first API gateway by the authentication center;

S304: sending a document data stream to the system based on the data upload token by the first client;

S305: if the authentication center verifies that the data upload token is legal and valid, controlling the API gateway to send the document data stream to the storage management server.

The specific description in conjunction with S301 to S305 is that each API gateway here provides a data communication gateway for the associated client to aggregate and generate a data interaction interface. In order to ensure the security of data communication, an authentication center needs to be created in the system, each client performs real-name authentication and registration in the authentication center through the communicated API gateway, the authentication center issues a data upload token to each client based on the user information, and each client carries its corresponding data upload token, which sends the document data stream to the management server through the associated API gateway.

The authentication center here will be responsible for managing the user information, that is, the account and password information of the end user. When the user uploads the document data stream to the system based on the client, it is necessary to extract the user information and verify the account password first. The data upload token is issued, and the data upload token is generated by an encryption algorithm; the user end should bring the data upload token when sending the document data stream to the system end, and the docking application system end uses the data upload token as all the required data uploading tokens. The interface for authority control, each interface will hand over the data upload token to the authentication center to verify the authority. If the authentication center verifies that the data upload token is legal and valid, it controls the API gateway to send the document data stream to the management server for business processing. The authentication center here can be implemented by an independent authentication server or a management server. By sending a data upload token, the legitimacy of the data sent by the client is guaranteed, and the security of data transmission is also guaranteed.

S306: receiving the document data stream sent by the client via the storage management server;

S307: parsing the document type of the electronic document by the storage management server;

S308: matching the corresponding first storage server based on the document type of the electronic document and the user information by the storage management server;

S309: sending the corresponding electronic document to the corresponding first storage server by the storage management server;

Specifically described in conjunction with S306 to S309, the storage management server here receives the document data stream sent by the client, and the document data stream includes: user information and electronic documents; the storage management server parses the document type of the electronic document; the The storage management server matches the corresponding first storage server based on the document type of the electronic document and the user information; the storage management server sends the corresponding electronic document to the corresponding first storage server; the first storage server is based on The digital watermark loading rule of the first storage server loads the digital watermark on the electronic document; the first storage server stores the electronic document loaded with the digital watermark.

Specifically, the storage management server performs automatic authorization processing on the distributed storage tasks that have been marked as automatically authorized, and the storage management server is provided with a first-in-first-out stack and an external storage structure; the management server first Push the document data streams sent by different clients into the first-in first-out stack; after the stacking is successful, the storage management server performs self-authorization and execution-related actions on the distributed storage task and pushes the completion flag into the first-in-first-out stack. First-out stack; when judging that the FIFO stack overflows, copy the overflowed document data stream to external storage according to the FIFO principle, and generate overflow copied information and push it into the FIFO stack.

Specifically, the storage management server parses and processes the document data streams in the FIFO stack according to the FIFO principle; the storage management server parses and processes a document data stream after parsing and processes the corresponding document data stream. Automatically delete from the FIFO stack; when the storage management server finds the overflowed copied information, it sends the overflowed document data stream in the external storage back to the FIFO stack for parsing according to the FIFO principle deal with.

The storage management server receives the document data stream sent by the client based on the self-authorization management method, and it can respond to the document data stream on the client in real time, avoiding the accumulation of document data streams on the task processing end and failing to realize the task processing, and also avoiding the document data stream. Electronic documents in the data stream are missing.

S310: loading a digital watermark on the electronic document based on a digital watermark loading rule of the first storage server by the first storage server;

S311: storing the electronic document loaded with the digital watermark by the first storage server.

Specifically described in conjunction with S310 to S311, the loading methods of the digital watermark here include: a spatial domain watermark loading method and a transformation domain watermark loading method.

It should be noted that, loading the digital watermark on the electronic document by the first storage server based on the digital watermark loading rule of the first storage server includes: analyzing and analyzing the electronic document, and determining the watermark parameters to be configured and the parameter values of the watermark parameters; The watermark parameters and the watermark parameter values construct watermark information; the watermark information is loaded into the designated position of the electronic text to generate an electronic document with a digital watermark.

The watermark parameter includes at least one of the following: a storage path of the watermark image, the horizontal quantity of the watermark, the vertical quantity of the watermark, the transparency of the watermark image, and the rotation angle of the watermark image. Each of the several distributed storage servers has its own digital watermark loading rule, which presets the watermark parameter and the parameter value of the watermark parameter in combination with the type of electronic document to be stored, which can be used for different electronic documents. The document realizes the watermark loading, which meets the watermark loading requirements of different types of electronic documents, making the watermark loading more standardized.

The storage path of the watermark image here includes but is not limited to the size of the watermark image and the type of the watermark image. The size of the watermark image should be reasonably set in combination with the horizontal quantity of the watermark and the vertical quantity of the watermark. The type of the watermark image should support the construction of the generated bitmap, the supported files The formats are BMP, GIF, EXIF, JPG, PNG and TIFF, etc.

The horizontal number of watermarks here refers to the horizontal arrangement of watermark images, which can be set between 1 and 20 in combination with the document type; for example, taking an A4 page as an example, the width of the watermark image×the horizontal number of watermarks cannot be greater than 500.

Here, the transparency of the watermark image can be set to a value between 1-254. The larger the value, the clearer the image.

Here, the rotation angle of the watermark image can be set to a value between 0-360, which can be a clockwise rotation angle or a counterclockwise rotation angle.

It should be noted that the page width and page height of the electronic document can be obtained during the analysis and analysis of the electronic document, and the watermark parameters and parameter values of the watermark parameters are adaptively configured based on the page width and page height.

In this embodiment of the present invention, a distributed storage system is used to manage different electronic documents for user information and electronic document types, so that it can match different storage servers in combination with user information or roles to store electronic documents sent by the client. Electronic documents can be adaptively stored to meet user level or role requirements. In order to facilitate the management and review of electronic documents, different distributed storage servers combine electronic document types to load digital watermarks on electronic documents stored on the server, so that electronic documents have corresponding watermarks, so that electronic documents have certain traceability, and it is also convenient to Subsequent users manage and review electronic documents stored on the system, which also facilitates copyright management of electronic documents. The distributed storage system can be widely used in e-government and network office environments, and it also facilitates the unified management of electronic documents in e-government and network office environments, reduces document organization errors, and loads corresponding digital files for different electronic document types. The watermark also reduces the error rate of watermark loading and improves the storage efficiency of electronic documents in the distributed storage system.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method for storing electronic documents based on a distributed environment, which is characterized in that, the method stores the electronic documents based on a distributed storage system, each storage server of the distributed storage system is provided with one or more digital watermark loading rules, and the distributed storage system is controlled by a management server to store the electronic document sent by a user terminal, wherein the method comprises steps of:

generating a data upload token based on user information and controlling the client to send the document data stream based on the data upload token by the management server;

receiving the document data stream sent by the user via the management server, wherein the document data stream comprises: user information and electronic documents;

parsing the document type of the electronic document by the management server;

obtaining the digital watermark loading rule of the electronic document based on the document type and user information of the electronic document, and searching the distributed storage system for the storage server corresponding to the digital watermark loading rule based on the digital watermark loading rule of the electronic document by the management server; wherein the digital loading rule comprises a digital watermark parameter configured based on the document type of the electronic document and user information and a parameter value of the digital watermark parameter;

sending the corresponding electronic document to the corresponding storage server by the management server;

loading the digital watermark on the electronic document based on the digital watermark loading rule of the electronic document by the corresponding storage server;

storing electronic documents loaded with digital watermarks by the corresponding storage server;

wherein the searching for a storage server corresponding to the digital watermark loading rule in the distributed storage system based on the digital watermark loading rule of the electronic document comprises:

generating a broadcast instruction, and issues the broadcast instruction to the distributed storage system by the management server, wherein the broadcast instruction is used to request the digital watermark loading rules set by each storage server in the distributed storage system;

receiving feedback information fed back by each storage server based on the broadcast instruction via the management server, where the digital watermark loading rules set by each storage server are stored in the feedback information;

performing information pairing based on the digital watermark loading rule in each feedback information and the digital watermark loading rule of the electronic document by the management server;

wherein when the digital watermark loading rule of the electronic document is consistent with the information pairing of the digital watermark loading rule in the first feedback information in the respective feedback information, it is determined that the server corresponding to the first feedback information is corresponding storage server;

receiving the document data stream sent by the client including by the management server:

receiving the document data stream sent by the client based on the self-authorization management method by the management server; and the management server receives the document data stream sent by the client based on the self-authorization management method, comprising:

performing automatic authorization processing on the distributed storage tasks marked as automatically authorized by the management server, wherein the management server is provided with a first-in-first-out stack and an external storage structure; the sent document data stream is pushed into the FIFO stack; after the stacking is successful, the management server performs self-authorization and execution-related actions on the distributed storage task and pushes the completion flag into the FIFO stack; when the FIFO stack overflows, copying the overflowed document data stream to the external storage according to the FIFO principle, and generating the overflowed copied information and push it into the FIFO stack;

generating a data upload token based on the user information, and controlling the client to send the document data stream based on the data upload token by the management server; wherein upload token, data upload token is generated by encryption algorithm; the client bring the data upload token when sending the document data stream to the system, and the docking application system uses the data upload token as all the data that needs to be controlled; each interface hands over the data upload token to the management server to verify the authority; while verifying that the data upload token is legal and valid, the authentication center controls the API gateway to send the document data stream to the management server for business processing.

2. The method for storing electronic documents based on a distributed environment, as recited in claim 1, wherein parsing the document types of the electronic documents by the management server comprises:

parsing and processing the document data stream in the FIFO stack according to the FIFO principle by the management server;

automatically deleting the corresponding document data stream from the FIFO stack after parsing and processing a document data stream by the management server;

while finding the overflowed copied information, sending the overflowed document data stream in the external storage back to the FIFO stack for parsing processing according to the FIFO principle by the management server.

3. The method for storing electronic documents based on a distributed environment, as recited in claim 2, wherein the loading methods of the digital watermark include: a spatial domain watermark loading method, a transformation domain watermark loading method.

4. The method for storing electronic documents based on a distributed environment, as recited in claim 3, wherein the corresponding storage server loading the digital watermark on the electronic document based on the digital watermark loading rule comprises:

analyzing the electronic document to determine the digital watermark parameters to be configured and the parameter values of the digital watermark parameters;

constructing digital watermark information based on digital watermark parameters and digital watermark parameter values; and loading the digital watermark information is into the specified position of the electronic text, and generating the electronic document with the digital watermark.

5. The method for storing electronic documents based on a distributed environment, as recited in claim 4, wherein the digital watermark parameters comprise at least one of the following: the storage path of the digital watermark picture, the horizontal quantity of the digital watermark, the vertical quantity of the digital watermark, the transparency of the digital watermark image, and the rotation angle of the digital watermark image.

6. A system for storing electronic documents based on a distributed environment, which is characterized in that the system stores electronic documents based on a distributed storage system, each storage server of the distributed storage system is provided with one or more digital watermark loading rules, and the distributed storage system is controlled by the management server to store users; the electronic document sent by the terminal, wherein the system comprises:

several client terminals configured to provide users with an operation interface and send document data streams to the management server, wherein the document data streams comprise: user information and electronic documents;

a management server configured to generate a data upload token based on the user information, and control the client to send the document data stream based on the data upload token; receive the document data stream sent by the client, and parse the document type of the electronic document; document type and user information to obtain the digital watermark loading rules of electronic documents, and search for the storage server corresponding to the digital watermark loading rules in the distributed storage system based on the digital watermark loading rules of electronic documents; send the corresponding electronic documents to the corresponding digital watermark loading rules; on the corresponding storage server; the digital loading rule includes: a digital watermark parameter and a parameter value of the digital watermark parameter configured based on the document type of the electronic document and user information;

wherein the distributed storage system includes several storage servers, and each storage server in the several storage servers is configured to load a digital watermark on the electronic document based on the digital watermark loading rule of the electronic document, and store the digital watermark loaded with the digital watermark; electronic documents; the management server is also used to generate broadcast instructions and issue the broadcast instructions to the distributed storage system, where the broadcast instructions are used to request the loading of digital watermarks set by each storage server in the distributed storage system rules; and receive the feedback information fed back by each storage server based on the broadcast instruction, and the digital watermark loading rules set by each storage server are stored in the feedback information; and based on the digital watermark loading rules in each feedback information and the described the digital watermark loading rule of the electronic document is paired with information; when the digital watermark loading rule of the electronic document is consistent with the information pairing of the digital watermark loading rule in the first feedback information in the respective feedback information, it is determined that the server corresponding to the first feedback information is a corresponding storage server;

wherein the management server receives the document data stream sent by the client based on the self-authorization management method; the management server performs automatic authorization processing on the distributed storage tasks that have been marked as automatically authorized, and the management server is provided with a first-in-first-out stack and an external storage structure; the management server first pushes the document data streams sent by different clients into the FIFO stack; after the stacking is successful, the management server makes self-authorization and execution of the distributed storage tasks related behavior and push the completion flag into the FIFO stack; when judging that the FIFO stack overflows, copy the overflowed document data stream to the external storage according to the FIFO principle, and generate overflow copied information push onto the FIFO stack;

wherein the management server generates a data upload token based on the user information, and controls the client to send the document data stream based on the data upload token; upload token, data upload token is generated by encryption algorithm; the client should bring the data upload token when sending the document data stream to the system, and the docking application system uses the data upload token as all the data that needs to be controlled; each interface hands over the data upload token to the management server to verify the authority; if the authentication center verifies that the data upload token is legal and valid, it will control the API gateway to send the document data stream to the management server for business processing.

7. The system for storing electronic documents based on the distributed environment, as recited in claim 6, wherein the system further comprises several API gateways, each of which of each API gateway in several API gateways to communicate with one or more users, and several API gateways send the document data streams on several users to the management server.

\* \* \* \* \*